United States Patent [19]

Deutsch

[11] 4,263,001
[45] Apr. 21, 1981

[54] APPARATUS AND METHOD FOR ENHANCEMENT OF OPTICAL IMAGES

[76] Inventor: Jeffrey T. Deutsch, 5505 Constant Spring Terr., Lauderhill, Fla. 33311

[21] Appl. No.: 943,062

[22] Filed: Sep. 18, 1978

[51] Int. Cl.³ .............................................. G03B 27/72
[52] U.S. Cl. ....................................... 355/45; 355/71; 355/80; 355/67; 355/77
[58] Field of Search ................. 355/20, 35, 38, 40–43, 355/45, 67–71, 77, 80; 354/227; 350/330–334, 353, 359, 355–357

[56] References Cited

U.S. PATENT DOCUMENTS

| 2,985,065 | 5/1961 | Haynes et al. | 355/41 X |
| 3,521,954 | 7/1970 | French | 355/80 |
| 3,537,788 | 11/1970 | Young | 355/20 X |
| 3,555,987 | 1/1971 | Browning | 354/227 |
| 3,772,465 | 11/1973 | Vlahos et al. | 355/40 X |
| 3,784,736 | 1/1974 | Novak | 358/130 |
| 4,017,680 | 4/1977 | Anderson et al. | 358/242 |
| 4,050,814 | 9/1977 | McFadden | 354/227 X |

Primary Examiner—George H. Miller, Jr.
Assistant Examiner—W. J. Brady
Attorney, Agent, or Firm—Malin & Haley

[57] ABSTRACT

A method and apparatus used therein for modifying and enhancing the color, tonal range, highlight and shadow detail of an optical image, photograph, or photographic transparency in which the image to be enhanced is formed as a collection of small areas, called fields; the intensity and filtration of each field is independently adjustable for the purpose of achieving the desired enhancement of the image. In one embodiment, a photographic transparency is positioned in the front of a uniformly diffused light source. A video camera receives the image, transmitting it to a video tape recorder (or other device capable of single frame storage) through a special effects generator that can provide intensity and contrast control of the image, either positive or negative. The single frame is then displayed on a cathode ray tube (CRT) which has a diffuser positioned between it and the source transparency. The resultant modified, enhanced image is then photographed.

8 Claims, 6 Drawing Figures

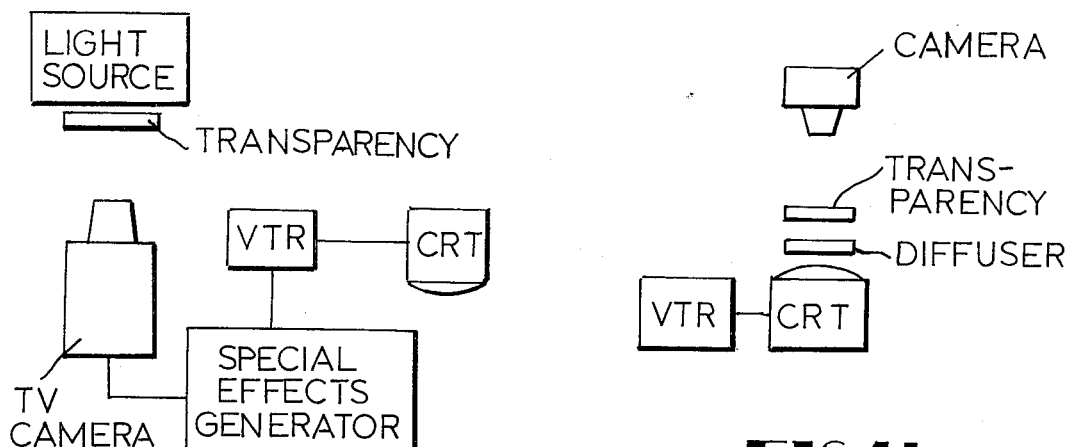
FIG.1a
FIG.1b
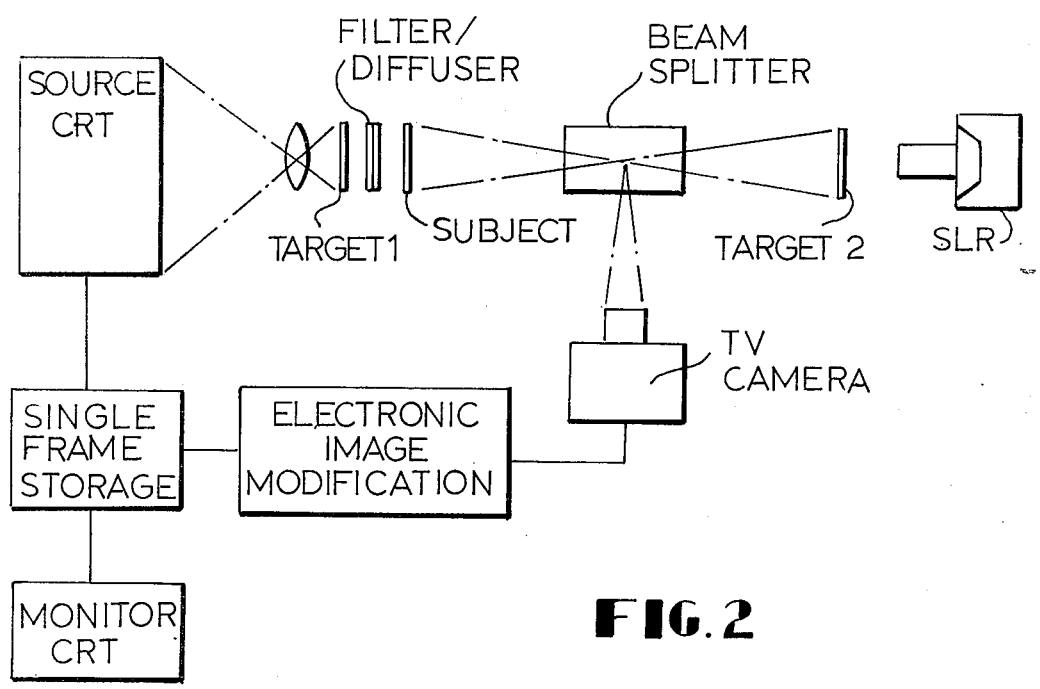
FIG.2

APPARATUS AND METHOD FOR ENHANCEMENT OF OPTICAL IMAGES

BACKGROUND OF THE INVENTION

This invention relates to a process and the apparatus utilized therein for enhancing the tonal quality and details of an optical image, photograph or photographic transparency using electronically controllable techniques.

Various methods have been employed in the past to enhance a photograph. For example, in the exposure stage when taking the photograph, one can sometimes control the lighting to achieve a desired tonal quality in the photograph. This is quite time consuming and does require a complete control of the environment photographed and the subject matter, which at best is rare. Actually, many photographs are taken to capture an event that does not provide the luxury of time for setting up the scene with respect to the surrounding illumination.

In another method, the tonal scale of a black and white photographic image may be modified by changes in the development process. Using color film, the approach becomes almost impossible because the three film layers of red, blue, and green respond differently to changes in development. Changes made to the image in the development process are irreversible.

Other techniques involve modifying the image when the photograph is actually printed from the developed transparency. One advantage of this method is that if a mistake is made such that the results are not those desired, it merely requires that another print be made. If all of the desired information is present in the source transparency, either a positive or a negative, the visual tonal range can be compressed or expanded by using an unsharp or sharp light mask. A mask is normally a copy of the image placed in direct contact with it. A positive mask would increase contrast while a negative mask would decrease contrast. One of the problems encountered in this technique is the alignment of the mask (a greater problem using the sharp mask rather than an unsharp mask). Another method for enhancing a photograph can be employed by manually modifying the light hitting the print. One technique is called "burning in" which allows more light to hit a selected part of the image, and conversely "dodging" which allows less light to hit selected areas of the print. These are done normally with special tools or manually by the printer himself. "Burning in" and "dodging" are not practical for mass production of photographic prints.

One common problem in the production of a photograph is the illumination of different parts of the subject by multiple light sources of different special characteristics. There is no known optical method for correcting an image photographed under these conditions.

The present invention provides an improvement over the techniques discussed above in that the present invention and improved method disclosed herein allows for electronically controllable tonal modification of the final image photographed which can be done accurately and consistently on a mass production basis. The colors and tones at all locations of the projecting surface may be independently modified to achieve the desired enhancement of the source image, and the resultant composite image viewed and reproduced, photographically or otherwise.

The resolution of the enhancement means only affects the quality of enhancement not the resolution of the composite image.

BRIEF DESCRIPTION OF THE INVENTION

A method and the apparatus used therein for modifying and enhancing the color, tonal range, highlight and shadow detail of an optical image, photograph, or photographic transparency, either for displaying recording, or reproducing the original image by forming that image as a collection of relatively small areas (called fields), modifying or correcting each field to adjust the amount and color of light such as red, blue, and green, passing therethrough to achieve particular desired optical qualities such as brightness, hue, and contrast with respect to the overall image. The optically modified and enhanced source image may be viewed "live" or reproduced in fixed form, photographically or otherwise. In one embodiment, an image is projected through an array of optical image modifying cells, each cell of which may be electronically controlled to provide the desired change in the quantity and color of light passing through the individual cell either by a variable attenuation of the light passing through the cell or fixed attenuation with a variable light source intensity or duration either for single or multiple intervals. The optical modification provided by the cell array enhances the original image, and the resultant image may be viewed or copied.

The invention, in another embodiment, uses a cathode ray tube as the image display light source, a lens and (optionally) a light diffuser to reduce the need for precise of the cathode ray tube projected image with the original subject transparency image, and remove scanning lines and a camera for recording the resultant enhanced and modified image. A special effects generator is used to provide a negative image on the cathode ray tube light source if desired. Single frame storage is provided to prevent feedback between the CRT and the device used for optically analyzing the original source image.

And yet, in another embodiment, field attenuation image processing can be accomplished using three light sources (such as flash tubes) of red, blue, and green which are sequentially pulsed acting as the primary light source for the subject transparency. This light source will be pulsed for varying amounts of time based on the required quantity and color of the light. The light from this source is then mixed to a homogeneous intensity over the field attenuator, a device comprised of an array of cells (such as a liquid crystal array), each of which may pass or attenuate light passing through that cell, independently during each color-interval, thus the effective exposure and filtration of each field may be separately controlled, and processed through enlargement or reduction optics to strike a target (optional) which would be placed directly over the image film transparency. A mirror, beam-splitter, or similar device is used to project the image, or a copy of it, onto a device able to measure the brightness and color of each field. The light source may be controlled by the operator, both as to color and brightness. Also, local control can be established through the use of a "light pen", a device capable of providing a signal proportional to the quantity of light it receives, (such as a pancromatic photo sensor) used in combination with the light sources and field attenuator, providing the system with the information on color, brightness, and position of the area it is directed towards. The controlled light sources, light pen, field analyzer and attenuator would all be connected through a central microcomputer. The field attenuator could be constructed of a light crystal array while the field analyzer could be an optical charge coupled device having substantially the same resolution as the attenuator. One of the advantages of this method is that it is possible to selectively control the modified color and relative intensity of the fields of an image without loosing any detail of the original image itself.

It is an object of this invention to provide for an apparatus and method that allows mass production enhancement of photographs or photographic transparencies.

It is another object of this invention to provide a new method for more quickly but accurately enhancing a photograph to insure electronically that the final photograph has the desired highlight and shadow detail.

But yet, still another object of this invention is to provide an improved photographic image enhancement technique for adjusting electronically light tonal qualities, color intensities, and other desired characteristics to achieve a final photograph.

And yet, still another object of this invention is to provide an apparatus and method for enhancing an optical image to be recorded, a photograph or a photographic transparency that makes it possible to either automatically or manually selectively control or modify the relative intensity and color-balance of the fields of an image or the color tonal qualities of an image without sacrificing detail of the original image itself.

In accordance with these and other objects which will be apparent hereinafter, the instant invention will now be described with particular reference to the accompanying drawings.

BRIEF DESCRIPTION OF THE DRAWINGS

FIGS. 1a and 1b show a schematic diagram of an apparatus utilized to perform the method of the instant invention.

FIG. 2 shows a schematic diagram of an alternate embodiment apparatus employed to accomplish the method of the instant invention.

PREFERRED EMBODIMENTS OF THE INVENTION

Figure 3:
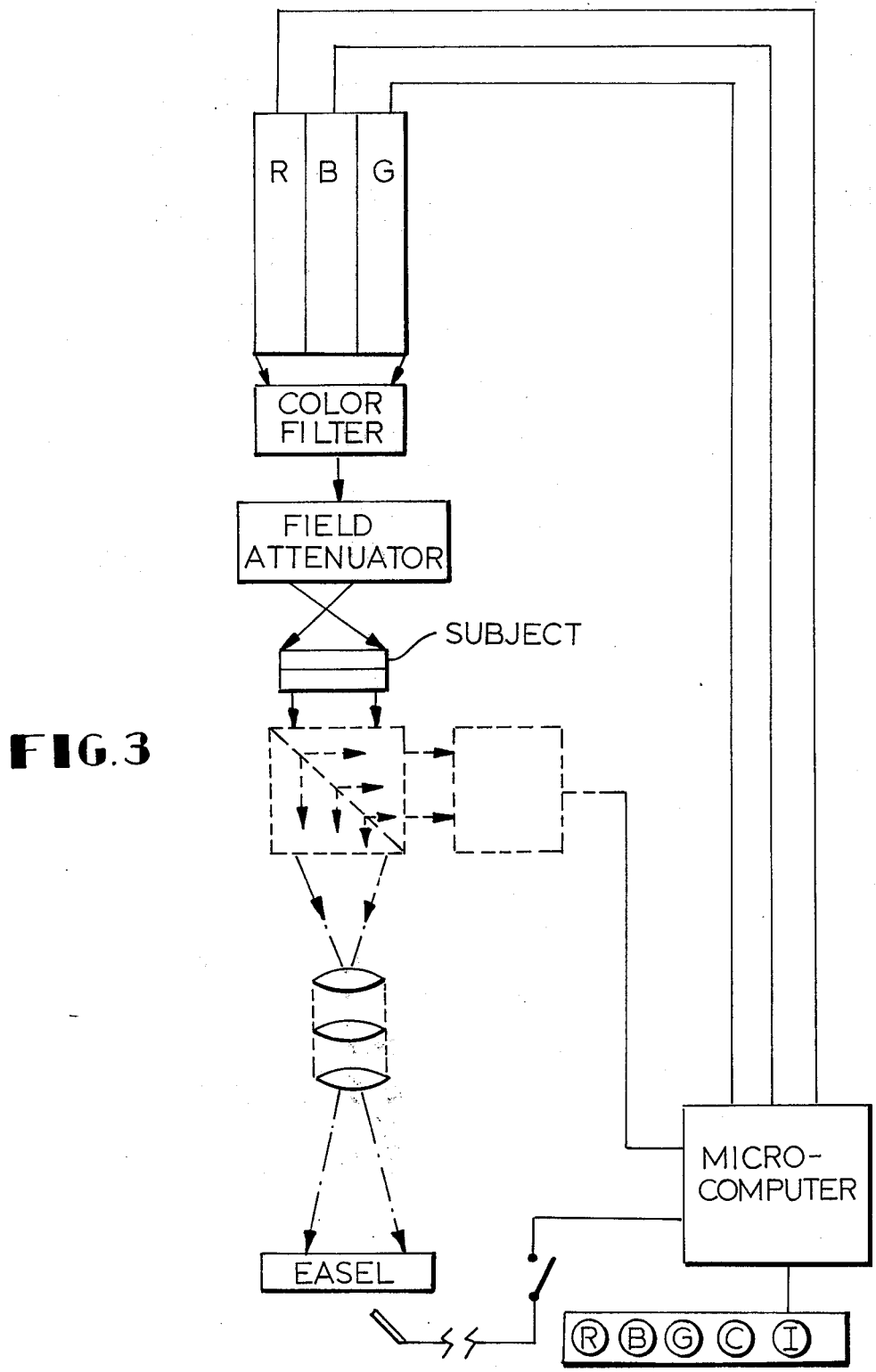
FIG. 3 shows another embodiment of the instant invention.

Referring now to the drawings, and specifically FIG. 2, one embodiment of the instant invention is shown which uses optical image processing as described below. The light source is a cathode ray tube, and provides means for modification of the video image which projects and has recorded thereon the original transparency image through a lens and a light diffuser to be optically aligned with the subject film transparency having the original image to be enhanced. A beam splitter is employed to receive the image projected from the light source CRT through the original transparency providing two identical target images, one of which is received by a video camera connected through a special effects generator which provides controllable modification of the video image, or its negative, through a device which isolates a single frame to prevent feedback to the light source CRT. The second target image goes to a recording device which will receive and record the final enhanced image. Unlike other conventional methods that may post process the transparency or other source image, the device as shown in FIG. 2, processes the light before it hits the original image transparency. During exposure, no equipment is needed between the image and the lens. Both color and contrast of a photographic image can be modified either locally or throughout without losing any detail of the original image. The brightness, color, contrast, and other effects on the light source CRT thus can be manipulated and altered to affect the resultant electronic image projected through the diffuser and original image transparency received by the recording device. The adjustment can be to enhance the final image as desired, looking for specific characteristics resulting in a final photographic print having the desired highlight and shadow definition and tonal qualities required.

Referring now to FIGS. 1a and 1b, a two-stage process is shown where in FIG. 1a a light source is used with the original transparency to project an image to the video camera which is transmitted through a special effects generator to a video tape recording where the original image is recorded and then transmitted to a cathode ray tube used to monitor the modifications.

In the reproduction stage, the recording of the modified original image is displayed on the cathode ray tube light source through a diffuser, again optically projecting the displayed image on the cathode ray tube through the original transparency to a camera that is used for reproduction. The problem of precise alignment is overcome by using the diffuser which diffuses the image received from the cathode ray tube display. The diffuser also removes scanning lines which are present in the cathode ray tube. Size relationship problems between the projected image and the original transparency are overcome by using various lens to achieve a one-to-one size relationship between the source image and the projected image from the cathode ray tube.

Referring now to FIG. 3, another embodiment is shown in which the light source is comprised of red, blue, and green lights, sequentially pulsed varying any one or all of duration, intensity, and number of times based on the required color of the light. The light so pulsed is then mixed to a homogeneous intensity through a field attenuator comprised of a liquid crystal array. Each element of the array acts as an independent cell that passes or attenuates light passing through in accordance with a control signal to each cell, in combination with the sequential light source, effectively providing each field with independently controlled color and brightness. The light source may be controlled by a microcomputer and image characteristic controls for the various colors and contrasts. The light source then is optically projected through the original image transparency to a lens system having a retractable beam splitter producing two identical optical images for both field analysis of the projected enhanced image and for display on an easel or the like. The microcomputer system may also include a light pen which can be used on the easel display for altering and enhancing. Again, using this device it is possible to selectively control and modify color and relative intensity of the fields of the image without losing any detail from the original image itself.

Figure 4:
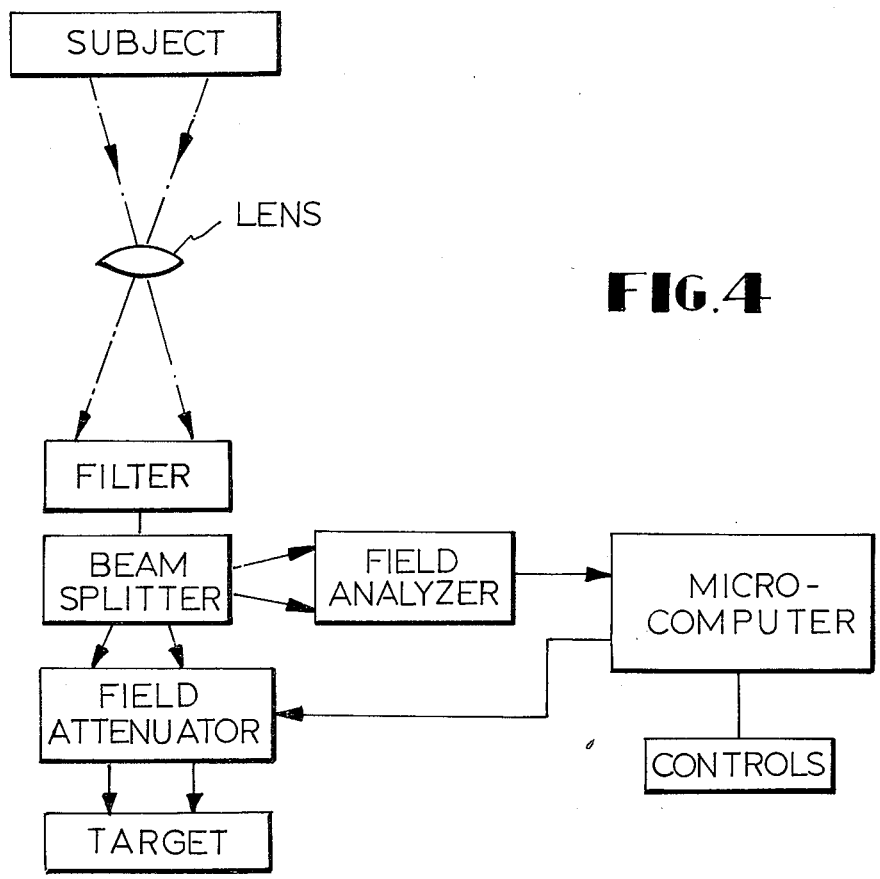
FIG. 4 shows a schematic diagram of the instant invention using field attenuation image processing.

FIG. 4 shows field attenuation image processing which includes projection of the subject optical image through a lens to a beam splitter which splits the original image into two source images, one of which passes through the field attenuator while the other is received by the field analyzer which is coupled to a microcomputer having controls which allow for adjustment of intensity, hue, contrast and the like of the image as it is displayed through the field attenuator. Adjustments can then be made visually while looking at the image as modified by the filters and field attenuator to achieve the desired image to be processed by manipulation of the controls in the micro-computer. The computer can also be pre-programmed to control the field attenuator to achieve particular type of enhancement.

Figure 5:
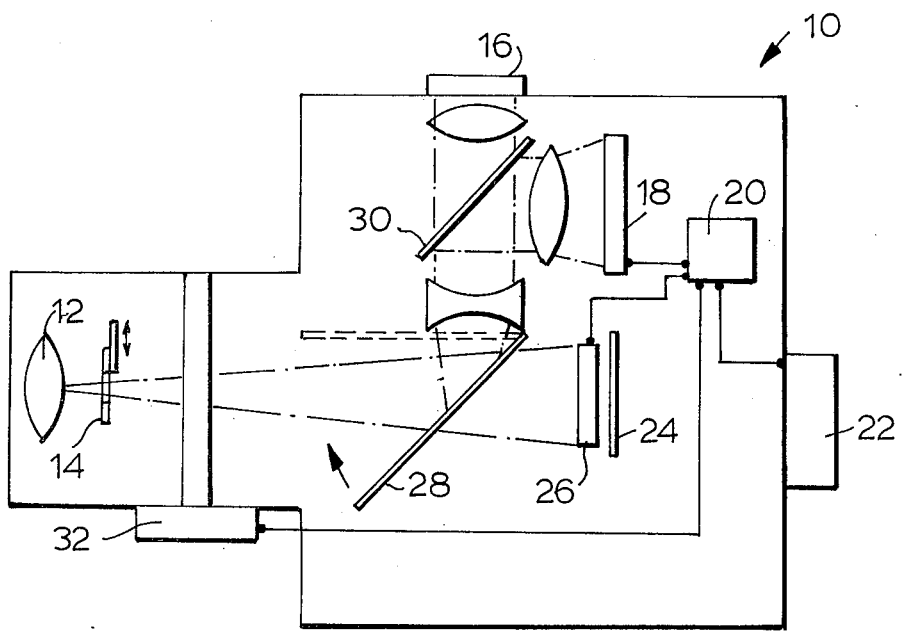
FIG. 5 shows a schematic diagram of a camera which is a single lens reflex using field attenuation image processing in accordance with the instant invention.

FIG. 5 shows how the field attenuation image processing may be utilized with a single lens reflex camera 10 such that an enhanced processed image will be the image recorded on the film 24 in the camera. The image as received of the subject passes through the initial lens 12 and through filters to a mirror which allows the image to be viewed through the eyepiece 16 and also transmitted to the field attenuator 26. Controls 22 and 32 connected to a microcomputer 20 coupled to the field analyzer 18, the field attenuator 26, and filters allows one to enhance the image to that desired prior to actually taking the photograph. The shutter then will allow the enhanced optical image to be recorded on the film after the image has been enhanced as desired.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method for optically modifying an optical image of the subject comprising the steps of:
   (1) projecting the original subject optical image onto an array of controllable, light-transmitting cells, each of said cells in said array being individually controllable as to a plurality of different desired optical characteristics of the light transmitted therethrough;
   (2) modifying at least one optical characteristic within at least one of said cells; and
   (3) transmitting an image from said array of said light-transmitting cells.

2. The method as in claim 1, including the step of:
   (3) recording in fixed form the transmitted image.

3. The method as in claim 1, including the step of:
   (4) viewing the transmitted image.

4. The method as in claim 1, including the step of:
   (5) attenuating the light transmitted through selected cells in said array to achieve a modified image.

5. A device for optically enhancing an original optical image of a subject comprising:
   an array of electromagnetic energy transmitting cells, each of said cells being controllable for a plurality of different desired optical characteristics of the light transmitted therethrough; and
   means for modifying at least one optical characteristic of electromagnetic energy transmitted through each of said cells connected individually to each cell such that at least one optical characteristic of the electromagnetic energy transmitted through a cell can be individually modified.

6. A device as in claim 5, including:
   a means to control the modifying means coupled to the modifying means to control particular predetermined characteristics of the electromagnetic energy as it is transmitted through an individual cell.

7. A device as in claim 6, including:
   a means for displaying the modified image transmitted through the array of cells.

8. A device as in claim 6, including:
   means to record the electromagnetic energy transmitted through said array of cells.

* * * * *